Oct. 28, 1952 A. H. RZEPPA 2,615,317
CONSTANT VELOCITY UNIVERSAL JOINT
Filed May 31, 1949 2 SHEETS—SHEET 1
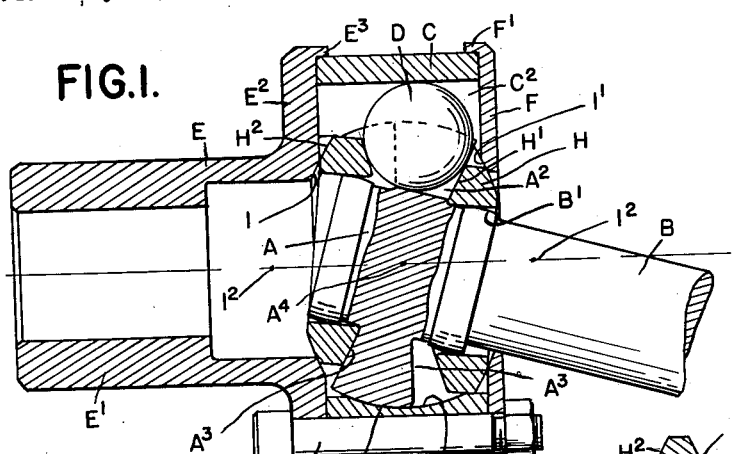
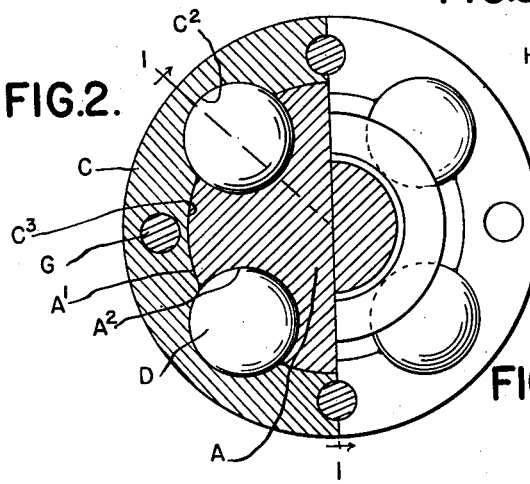
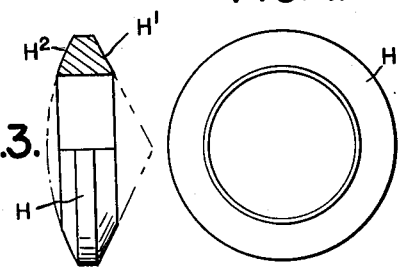
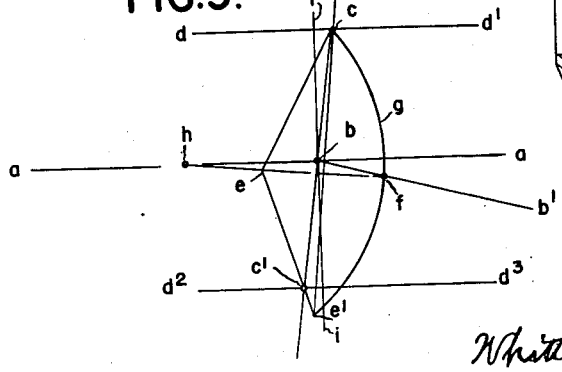
INVENTOR.
ALFRED H. RZEPPA
BY
*Whittemore Hulbert & Belknap*
ATTORNEYS Oct. 28, 1952 — A. H. RZEPPA — 2,615,317
CONSTANT VELOCITY UNIVERSAL JOINT
Filed May 31, 1949 — 2 SHEETS—SHEET 2

INVENTOR.
ALFRED H. RZEPPA
BY Whittemore Hulbert & Belknap
ATTORNEYS

Patented Oct. 28, 1952

2,615,317

UNITED STATES PATENT OFFICE 2,615,317

CONSTANT VELOCITY UNIVERSAL JOINT

Alfred H. Rzeppa, Grosse Pointe, Mich.

Application May 31, 1949, Serial No. 96,278

4 Claims. (Cl. 64—21)

The invention relates to torque transmitting universal joints of the constant velocity type, and more particularly the invention relates to that type comprising inner and outer spherically engaged members having axially extending grooves in their meeting faces and balls in said grooves for transmitting torque therebetween. With constructions of this type it is essential to proper functioning that the torque transmitting balls should always be maintained in a plane passing through the center of the joint and bisecting the angle between the axes of the two members in every position of relative adjustment thereof. Various means for this purpose have heretofore been used, but it is the object of the instant invention to obtain an improved means relatively low in friction and adapted for a higher range of R. P. M.

To this end the invention consists in the construction as hereinafter set forth.

In the drawings:

Fig. 1 is a longitudinal section through my improved universal joint taken on line I—I, Fig. 2;

Fig. 2 is a cross section partly in elevation with the cap removed;

Figs. 3 and 4 are respectively a side elevation partly in longitudinal section and an end elevation of one of the wedge rings;

Figs. 5 and 6 and Figs. 7 and 8 are similar views of modified constructions;

Fig. 9 is a diagram illustrating the geometry involved in the construction of the ball shifting means;

Figure 10:
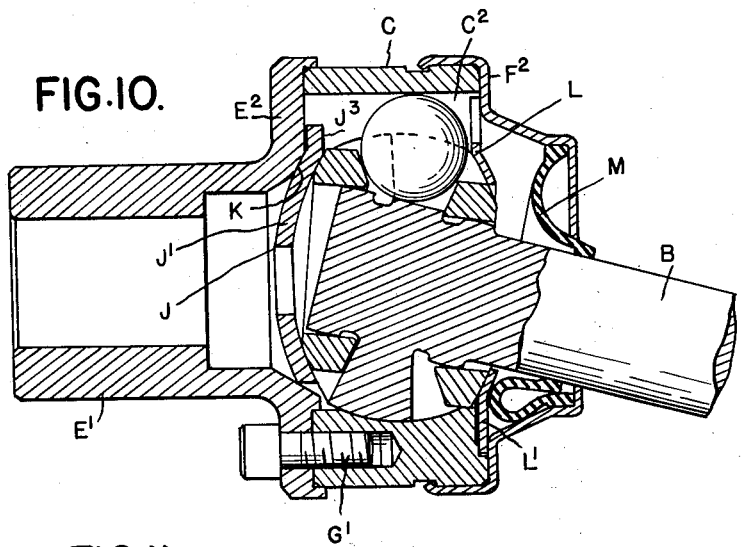
Fig. 10 is a view similar to Fig. 1 showing a modified construction.
Figure 11:
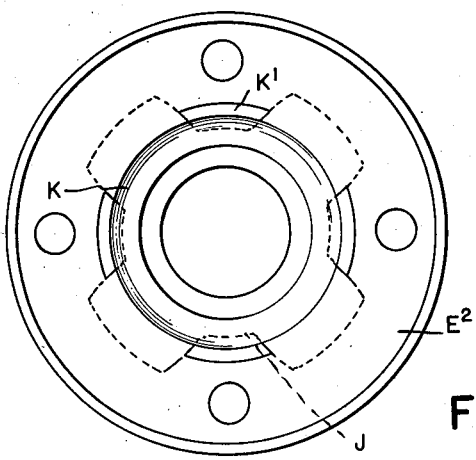
Fig. 11 is an elevation of the head or the outer rotary member with the grooved section removed and viewed towards the left Fig. 10.
Figure 12:
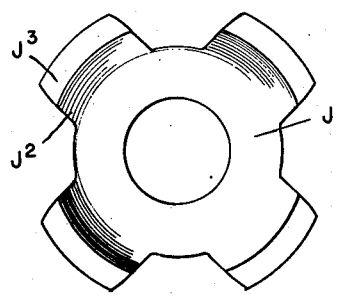
Fig. 12 is an elevation of the spherical guide member for engagement with the head of Fig. 10.

As illustrated in Figs. 1 and 2, A is the inner member of the joint having a peripheral, segmental, spherical surface A' and a series of axially extending spaced grooves $A^2$. As specifically shown the member A is integral with a shaft B of small diameter which extends upon opposite sides thereof. Undercut recesses $A^3$ are also formed in the opposite ends of the portion A which extends outward beyond the shaft.

C is the outer member which has a spherical surface C' for engagement with the peripheral surface A' of the member A and is also provided with axially extending grooves $C^2$ normally registering with the grooves $A^3$ of the member A. The members A and C may be engaged with each other by first aligning the portion $C^3$ between the grooves $C^2$ with the grooves $A^2$ and moving the two members into the same plane where the centers of their spherical surfaces coincide. By then slightly rotating the one member with respect to the other, the convex spherical portions A' will engage the concave spherical surfaces $C^3$ and the grooves $C^2$ and $A^2$ are moved into registration. Balls D are then inserted in the registering grooves and will form the torque transmitting couple.

As above stated it is essential to always maintain the torque transmitting balls in a plane which bisects the angle between the axes of the two main members. This I accomplish by the following construction. The outer member C is attached to a rotary member E which may be of any suitable construction according to the specific use for which the joint is designed. This member, as specifically shown, has a hub portion E' and a head portion $E^2$, which latter has a projecting pilot flange $E^3$ for engaging one end of the member C and holding the same in concentric relation thereto. At the opposite end of the member C is a cap member F having a similar pilot flange F' for holding it in concentric relation. These two members $E^2$ and F close the opposite ends of the channels $C^2$, but the axial length of the member C is sufficiently greater than the diameter of the balls D to provide the necessary clearance for movement of said balls in the maximum angular movement of the axes of the shafts with respect to each other. The members E, C and F are secured to each other by bolts G, or any other suitable attachment means. Surrounding the portions of the shaft B, which are on opposite sides of the center of the member A, are annular members H which are of a radially outwardly tapering wedge-shape cross section. These members bear upon spherical portions B' on the shaft B which are on opposite sides of and equispaced from the common center $A^4$ of the main members A and C. The inner faces H' of the members H bear upon the balls D, while the outer faces $H^2$ engage concave spherical guide surfaces I and I', respectively, on the members E and F. The centers $I^2$ of these spherical guide surfaces lie in the axis of the members C and E and are on opposite sides of the center A⁴. The arrangement is such that in every position of relative angular adjustment of the axes of the members B and E, the members H will be in contact with the balls and also the guide surfaces I and I'. Also these members H will during relative angular movement of said axes rock upon the spherical surfaces I², as well as being radially shifted with respect to the center A⁴. The proportioning of the parts is such that the angular movement of the plane of the balls about the center A⁴ is exactly one-half of the relative angular movement of the axes respectively of the member E and the shaft B. Thus the balls will transmit torque at uniform velocity in all portions of the rotation about the center A⁴ and will avoid any cramping in the raceway grooves A² and C².

The annular wedge member H is shown in detail in Figures 3 and 4, and it will be noted that the surface H' thereof is a portion of a cone having its apex in the axis of said annular member. Also the surface H² is spherical to fit the spherical guide surfaces I or I'. The displacement of the balls is dependent upon several factors (1) the rocking movement of the members H upon the spherical surfaces B', which in turn is dependent upon the radius of the spherical guide surfaces I; (2) the radial displacement of said members H with respect to the center A⁴; and (3) the slope angle of the conical surface H'. These factors are so adjusted with respect to each other as to accomplish the desired result, viz., the movement of the plane of the balls about the center A⁴ through one-half the angle of relative movement of the axes of the members B and E. Or in other words the plane of the balls always bisects the angle between the axis of said members.

Figs. 5 and 6 show a modified construction of the annular wedge member H in which plane facets H³ are formed on said member opposite the ends of the grooves C² for bearing against the balls. With this construction the center of each facet provides slightly greater clearance than the opposite edge portions thereof, thereby tending to limit the rotation of the member H with respect to said balls. Figures 7 and 8 show another modification of wedge members in which the portions H⁴, which engage the balls, project axially beyond the portions H⁵ therebetween. Thus the portions H⁴ will extend into the ends of the raceway grooves C², and the portions H⁵ will provide greater axial clearance for the portions of the member A which are between said grooves.

The geometry involved is diagrammatically illustrated in Figure 9 in which the line $a-a$ represents the axis of the members C and E. $b$ is the common center of the engaged spherical surfaces of the members A and C. The line $b-b'$ represents the axis of the shaft B in its position of maximum angular adjustment with respect to the axis $a-a$. The points $c$ and $c'$ are the centers of the balls D and the lines $d-d'$ and $d^2-d^3$ represent the axes of the ball race grooves C². The cone represented by the lines $e-e'$ and $e-c$ is the face of the member H which engages the balls but is represented as passing through the centers of said balls. The position of this cone is determined by the point $f$ in the line $b-b'$, which also lies in the concave spherical surface indicated by the arc $g$ having its center $h$ in the axis $a-a$. Thus the apex of the cone is in the line $h-f$. Line $i-i$ represents a plane which is perpendicular to the axis $a-a$, and the line $c-c'$ is a plane perpendicular to the radius $h-f$. It will be observed that the angle between the planes $i-i$ and $c-c'$, which intersect at the point $b$, is just one-half the angle between the lines $b-a$ and $b-b'$.

Figure 13:
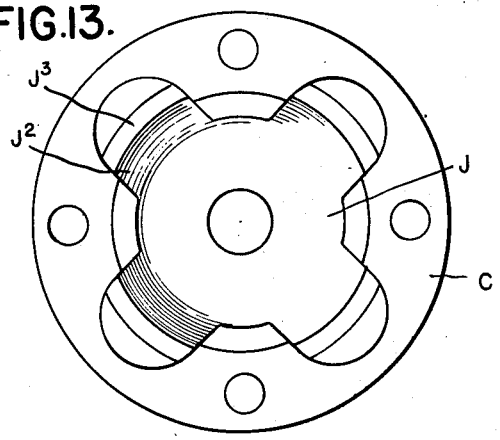
Fig. 13 is an end elevation of the outer spherical and grooved member viewed toward the right Fig. 10 and with the guide member in engagement therewith.
Figure 14:
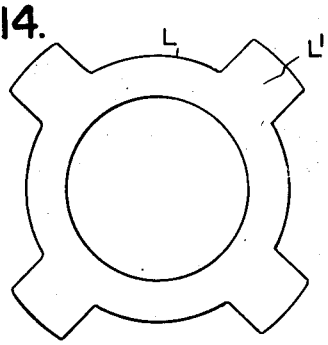
Fig. 14 is an elevation of the guide member at the right of the balls, Fig. 10.

Figure 10 shows a modified construction in which the spherical guide surfaces are formed members that are separate from the members E and F. One of these members J has a concavo-convex portion J' and radially outwardly projecting portions J² which are seated upon an annular bearing portion K on the head E². Projecting lugs K' extend between the portions J² to hold the members E² and J from relative rotation. The portions J² terminate in portions J³, which bear against the head E² beyond the spherical bearing K. The portions J² also engage the grooves C² as shown in Fig. 13 and thus form keys for holding the head E² and member C against relative rotation and relieving the bolts G' from torque stresses. On the opposite side axially of the balls is a guide plate L similar to the guide plate J but formed of lighter gauge material, so as to have greater flexibility and resilience. The radially outwardly extending portions L' are seated on the cap F². A flexible oil seal M is also arranged between the cap and the shaft B. The construction is otherwise the same as described in Figure 1, and the annular wedge members H are arranged between the balls and the guide plates J and L respectively. However the plate L being comparatively thin and resilient will place a limited yielding pressure on the adjacent member H to hold the same in contact with the balls and to compensate for any slight variation in dimensions of the parts either as originally made or due to wear. The advantage of this construction over the construction shown in Figure 1 is that the wear plates may be exchanged or renewed if necessary.

What I claim as my invention is:

1. A torque transmitting universal joint comprising inner and outer rotary members having engaged spherical surfaces with spaced axially extending registering ball race grooves therein, the outer of said members being of greater axial length than the inner member, balls in the registering grooves, heads at the axially opposite ends of the outer of said rotary members, one of said heads forming a detachable cap, guide plates adjacent to the respective heads and provided with concave spherical inner surfaces which are concentric with points in the axis of said outer rotary member respectively on opposite sides of the center of said spherically engaged surfaces, one of said guide plates being relatively rigid and the other resiliently yieldable, annular members having outwardly tapering wedge portions in contact with the respective balls and between the same and the concave spherical surfaces and said guide plates, the resiliently yieldable guide plate maintaining a limited pressure by said wedge portions against said balls, and spherical bearings on said inner rotary member on which said annular members are rockably mounted.

2. A torque transmitting universal joint comprising inner and outer rotary members having adjacent portions with directly engaged segmental spherical surfaces and circumferentially spaced axially extending ball race grooves therein, the grooved portion of the inner member being less in axial length than that of the outer member and having undercut recesses in the opposite ends thereof, balls in said grooves, a shaft of smaller diameter extending axially from one end of said inner member and also a short distance beyond the opposite end thereof, said outer member being externally of cylindrical form, a shaft receiving hub provided with a radially outwardly extending annular head connected to one end of said cylindrical member in axial alignment therewith, a head connected to the opposite end of said cylindrical member centrally apertured for the passage therethrough and angular movement of said first mentioned shaft, annular members extending within said undercut recesses rockably mounted at opposite ends of said inner member upon the shaft thereof and having wedge-shaped outer portions with conical surfaces in tangent contact with said balls respectively on opposite sides thereof, and end thrust bearings on said heads engaging the outer surfaces of said annular members whereby the relative angular movement of said shafts will through said annular members shift the plane of said balls one-half of said relative angular movement of said shafts.

3. The construction as in claim 2 having guide plates lining said heads and with concave spherical inner surfaces constituting said end thrust bearings.

4. The construction as in claim 3 having one of said guide plates resiliently yieldable to maintain a limited pressure on the adjacent annular members to take up all lost motion between said end thrust bearings, annular members and balls.

ALFRED H. RZEPPA.

REFERENCES CITED

The following references are of record in the file of this patent:

UNITED STATES PATENTS

| Number | Name | Date |
|---|---|---|
| 2,150,942 | Rzeppa | Mar. 21, 1939 |
| 2,313,279 | Suczek | Mar. 9, 1943 |